(12) United States Patent
Quaggiotto et al.

(10) Patent No.: US 12,145,606 B2
(45) Date of Patent: Nov. 19, 2024

(54) GENERIC ACTUATOR WITH CUSTOMIZED LOCAL FEEDBACK

(71) Applicant: STEERING SOLUTIONS IP HOLDING CORPORATION, Saginaw, MI (US)

(72) Inventors: Emilio Quaggiotto, Birmingham, MI (US); Michael R. Story, Bay City, MI (US); Michael J. Lask, Macomb, MI (US); Joachim J. Klesing, Rochester, MI (US); Peter D. Schmitt, Farmington Hills, MI (US); Owen K. Tosh, Saginaw, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 70 days.

(21) Appl. No.: 17/674,387

(22) Filed: Feb. 17, 2022

(65) Prior Publication Data
US 2023/0256981 A1    Aug. 17, 2023

(51) Int. Cl.
*B60W 50/029* (2012.01)
*B60W 10/20* (2006.01)
*B60W 50/02* (2012.01)
*B62D 5/04* (2006.01)

(52) U.S. Cl.
CPC .......... *B60W 50/029* (2013.01); *B60W 10/20* (2013.01); *B60W 50/0205* (2013.01); *B62D 5/049* (2013.01); *B60W 2050/022* (2013.01); *B60W 2050/0292* (2013.01); *B60W 2510/202* (2013.01); *B60W 2556/10* (2020.02)

(58) Field of Classification Search
CPC ............................ B60W 50/029; B60W 10/20
See application file for complete search history.

(56) References Cited

U.S. PATENT DOCUMENTS

| | | | |
|---|---|---|---|
| 6,996,502 B2 * | 2/2006 | De La Cruz | G06F 11/0748 714/E11.073 |
| 11,570,261 B1 * | 1/2023 | Dutra | G06F 11/3612 |
| 2005/0089027 A1 * | 4/2005 | Colton | H04Q 11/0005 370/380 |
| 2005/0172161 A1 * | 8/2005 | Cruz | G06F 11/2025 714/4.11 |
| 2009/0106518 A1 * | 4/2009 | Dow | G06F 3/0613 711/E12.002 |
| 2018/0196656 A1 * | 7/2018 | Miller | G06F 8/654 |
| 2018/0304828 A1 * | 10/2018 | Kitani | B60W 50/00 |
| 2020/0249930 A1 * | 8/2020 | Abe | G06F 9/4401 |
| 2021/0163021 A1 * | 6/2021 | Frazzoli | H04W 4/48 |
| 2023/0038938 A1 * | 2/2023 | Sakashita | H02P 5/74 |
| 2023/0057078 A1 * | 2/2023 | Kim | B62D 5/22 |

\* cited by examiner

*Primary Examiner* — Jess Whittington
(74) *Attorney, Agent, or Firm* — Dickinson Wright PLLC

(57) ABSTRACT

A method for controlling an actuator. The method includes generating, in response to receiving a torque command signal from a first controller, an actuator control signal. The method also includes selectively controlling the actuator based on the actuator control signal. The method also includes, in response to identifying a fault associated with the first controller: generating, responsive to a determination that a partition associated with a second controller includes a fallback indicator, a fallback actuator control signal; and selectively controlling the actuator based on the fallback actuator control signal.

20 Claims, 4 Drawing Sheets

GENERIC ACTUATOR WITH CUSTOMIZED LOCAL FEEDBACK

TECHNICAL FIELD

This disclosure relates to actuator control and in particular to systems and methods for providing actuator control using customized local fallback.

BACKGROUND OF THE INVENTION

A vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, or other suitable steering system. The steering system of such a vehicle typically controls various aspects of vehicle steering including providing steering assist to an operator of the vehicle, controlling steerable wheels of the vehicle, and the like.

Such a steering system may include a domain controller architecture, which may be used to control various actuators for engaging and/or actuating other components of the steering system. An advantage of a domain controller architecture is the ability to have "dumb" (e.g., function agnostic that may be programmed to accept a command and execute the command without being specifically programmed for an application). For example, a domain controller may send a torque command to an actuator used to control steering, and the actuator may include code (e.g., used to program the actuator) that is not specific to steering. This may allow for controller reuse and an off-the-shelf approach to developing and selling actuators, and less custom software (e.g., the software or code used to program the actuators may only be changed if corresponding motor hardware is changed).

SUMMARY OF THE INVENTION

This disclosure relates generally to actuator control.

An aspect of the disclosed embodiments includes a method for controlling an actuator. The method includes generating, in response to receiving a torque command signal from a first controller, an actuator control signal. The method also includes selectively controlling the actuator based on the actuator control signal. The method also includes, in response to identifying a fault associated with the first controller: generating, responsive to a determination that a partition associated with a second controller includes a fallback indicator, a fallback actuator control signal; and selectively controlling the actuator based on the fallback actuator control signal.

Another aspect of the disclosed embodiments includes a system for controlling an actuator. The system includes a processor and a memory. The memory includes instructions that, when executed by the processor, cause the processor to: generate, in response to receiving a torque command signal from a first controller, an actuator control signal; selectively control the actuator based on the actuator control signal; and, in response to identifying a fault associated with the first controller: generate, responsive to a determination that a partition associated with a second controller includes a fallback indicator, a fallback actuator control signal; and selectively control the actuator based on the fallback actuator control signal.

Another aspect of the disclosed embodiments includes an electronic control unit, in communication with an actuator. The electronic control unit includes a processor and a memory. The memory includes instructions that, when executed by the processor, cause the processor to: generate, in response to receiving a torque command signal from a controller, an actuator control signal; selectively control the actuator based on the actuator control signal; and, in response to identifying an interruption with the controller: generate, responsive to a determination that a partition associated with the electronic control unit includes a fallback indicator, a fallback actuator control signal; generate, responsive to a determination that the partition associated with the electronic control unit does not include the fallback indicator, the fallback actuator control signal based on a default value; and selectively control the actuator based on the fallback actuator control signal.

These and other aspects of the present disclosure are disclosed in the following detailed description of the embodiments, the appended claims, and the accompanying figures.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
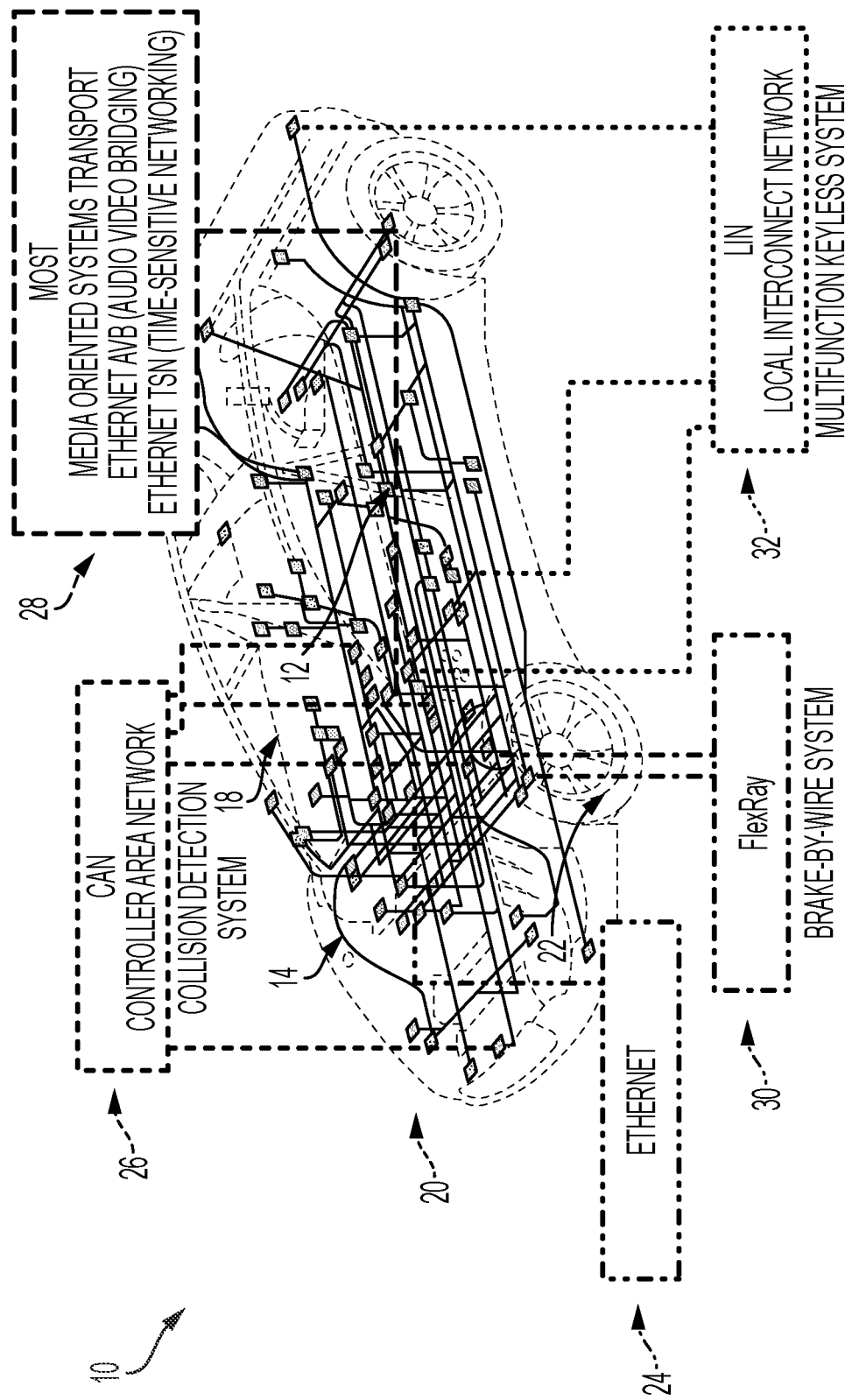
FIG. 1 generally illustrates a vehicle according to the principles of the present disclosure.

The following discussion is directed to various embodiments of the disclosure. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

As described, a vehicle, such as a car, truck, sport utility vehicle, crossover, mini-van, marine craft, aircraft, all-terrain vehicle, recreational vehicle, or other suitable forms of transportation, typically includes a steering system, such as an electronic power steering (EPS) system, a steer-by-wire (SbW) steering system, or other suitable steering system. The steering system of such a vehicle typically controls various aspects of vehicle steering including providing steering assist to an operator of the vehicle, controlling steerable wheels of the vehicle, and the like.

Such a steering system may include a domain controller architecture, which may be used to control various actuators for engaging and/or actuating other components of the steering system. An advantage of a domain controller architecture is the ability to have "dumb" (e.g., function agnostic that may be programmed to accept a command and execute the command without being specifically programmed for an application). For example, a domain controller may send a torque command to an actuator used to control steering, and the actuator may include code (e.g., used to program the actuator) that is not specific to steering. This may allow for controller reuse and an off-the-shelf approach to developing and selling actuators, and less custom software (e.g., the software or code used to program the actuators may only be changed if corresponding motor hardware is changed).

For safety-critical systems, it may be desirable to have a fallback option for control locally within an actuator. In this way, even if communication with the domain controller is lost, the actuator provides some amount of functionality (e.g., such as in a limp-home mode or other suitable functionality). However, the addition of fallback control options in the software or code used to control the actuator eliminates the use generic programming for actuator control in the domain controller architecture (e.g., each actuator may require custom software in order to function or operate).

Accordingly, systems and methods, such as those described herein, configured to provide actuator control that includes a fallback option, while maintain the use of generic actuator control, may be desirable. In some embodiments, the systems and method described herein may be configured to utilize a hypervisor (e.g., which may include a low-level software component that allows for multiple components of software to execute in parallel or substantially in parallel on a single piece of hardware) to maximize actuator reuse while allowing for an option to have a fallback control algorithm implemented locally. It should be understood that, while the hypervisor is described herein, the systems and methods described herein may use any suitable techniques or features to allow multiple software components to execute in parallel or substantially in parallel.

In some embodiments, the systems and methods described herein may be configured to flash each software component to a memory or a controller independently (e.g., with each software component being configured to operate without interfering with other software components, while being able to communicate with each other software component). The systems and methods described herein may be configured to provide software (e.g., using a hypervisor or other suitable technique or feature) developed in two parts, such as an actuator control software component and a fallback control software component.

In some embodiments, the actuator control software component may be configured to control the actuator based on a general control parameter, agnostic of the vehicle-wide function of the actuator. For example, an actuator that accepts a torque command may be used for vehicle steering, vehicle braking, and the like. The systems and methods described herein may be configured to use the actuator control software component to receive a torque command from the domain controller and to control the actuator based on the torque command from the domain controller.

Additionally, or alternatively, the systems and methods described herein may be configured to, in the absence of the toque command from the domain controller (e.g., or in the presence of a fault in communicate with the domain controller or the domain controller), use the fallback control software component (e.g., in response to determining that the fallback control software component is present on the controller associated with the actuator) to provide a torque command to the actuator control software component. The fallback control software may include a relatively simplified control system, specific to the function of the actuator. This may allow actuators to be produced in a functionally agnostic way, while allowing for specific functional elements to be optionally added. For example, during production of the controller of an actuator, the memory associated with the controller may be partitioned into at least two partitions, such as a first partition and a second partition. The first partition may be configured to receive and store the actuator control software component and the second partition may be configured to optionally receive and store the fallback control software component. This may allow for the advantages of the domain controller architecture to be, at least partially preserved, while allowing for maximum flexibility in deployment.

In some embodiments, the systems and methods described herein may be configured to generate, in response to receiving a torque command signal from a first controller, an actuator control signal. The first controller may include a domain controller or other suitable controller. The torque command signal may indicate a torque command. The torque command may be generated by the first controller responsive to one or more signals associated with one or more sensors of the vehicle. The torque command may correspond to an assist torque for assisting an operator of the vehicle with steering functions of the vehicle or other suitable application of the steering system or other suitable component of the vehicle.

The systems and methods described herein may be configured to, using a second controller, selectively control an actuator based on the actuator control signal. The actuator may be associated with a steering system or other suitable component of a vehicle. The steering system may include an EPS steering system, a SbW steering system, or other suitable steering system. The actuator control signal may indicate a voltage or current to be applied to the actuator. The second controller may be configured to receive torque commands from the first controller and to apply voltage and/or current to the actuator to achieve a torque associated with the torque command.

The systems and methods described herein may be configured to, in response to identifying a fault associated with the first controller: generate, responsive to a determination that a partition associated with the second controller includes a fallback indicator, a fallback actuator control signal; and selectively control the actuator based on the fallback actuator control signal. The fallback indicator may include a software component, such as the fallback control software component.

The systems and methods described herein may be configured to, using the software component, generate the fallback actuator control signal. For example, the systems and methods described herein may be configured to generate the fallback actuator control signal using one or more signals from one or more sensors of the vehicle, a previously received toque command from the first controller, one or more predetermined values (e.g., associated with a limp home mode or other suitable function or mode), other suitable information, or a combination thereof. For example, the fallback indicator may be associated with a corrective action. The corrective action may include generating a fallback value associated with a limp home mode, generating a fallback value based on at least one sensor signal, generating a fallback value based on a previous torque command signal from the first controller, and/or other suitable corrective action. The systems and methods described herein may be configured to, using the fallback control software component, the fallback actuator control signal based on the fallback value. The fallback value may correspond to an amount of toque to be applied to the actuator to cause the actuator to function in the absence of the torque control signal from the first controller.

In some embodiments, the systems and methods described herein may be configured to identify a fault associated with the first controller by identifying an interruption in communication with the first controller. For example, the systems and methods described herein may be configured to receive a signal indicating a fault with the first controller. Additionally, or alternatively the systems and methods described herein may be configured to detect a loss in communication with the first controller based on an absence of the torque command signal from the first controller. It should be understood that the systems and methods described herein may be configured to determine or identify a fault in the first controller or in the communication with the first controller using any suitable technique in addition to or instead of those described herein.

In some embodiments, the systems and methods described herein may be configured to generate, responsive to a determination that the partition associated with the second controller does not include the fallback indicator, the fallback actuator control signal based on a default value.

FIG. 1 generally illustrates a vehicle 10 according to the principles of the present disclosure. The vehicle 10 may include any suitable vehicle, such as a car, a truck, a sport utility vehicle, a mini-van, a crossover, any other passenger vehicle, any suitable commercial vehicle, or any other suitable vehicle. While the vehicle 10 is illustrated as a passenger vehicle having wheels and for use on roads, the principles of the present disclosure may apply to other vehicles, such as planes, boats, trains, drones, or other suitable vehicles The vehicle 10 includes a vehicle body 12 and a hood 14. A passenger compartment 18 is at least partially defined by the vehicle body 12. Another portion of the vehicle body 12 defines an engine compartment 20. The hood 14 may be moveably attached to a portion of the vehicle body 12, such that the hood 14 provides access to the engine compartment 20 when the hood 14 is in a first or open position and the hood 14 covers the engine compartment 20 when the hood 14 is in a second or closed position. In some embodiments, the engine compartment 20 may be disposed on rearward portion of the vehicle 10 than is generally illustrated.

The passenger compartment 18 may be disposed rearward of the engine compartment 20, but may be disposed forward of the engine compartment 20 in embodiments where the engine compartment 20 is disposed on the rearward portion of the vehicle 10. The vehicle 10 may include any suitable propulsion system including an internal combustion engine, one or more electric motors (e.g., an electric vehicle), one or more fuel cells, a hybrid (e.g., a hybrid vehicle) propulsion system comprising a combination of an internal combustion engine, one or more electric motors, and/or any other suitable propulsion system.

In some embodiments, the vehicle 10 may include a petrol or gasoline fuel engine, such as a spark ignition engine. In some embodiments, the vehicle 10 may include a diesel fuel engine, such as a compression ignition engine. The engine compartment 20 houses and/or encloses at least some components of the propulsion system of the vehicle 10. Additionally, or alternatively, propulsion controls, such as an accelerator actuator (e.g., an accelerator pedal), a brake actuator (e.g., a brake pedal), a steering wheel, and other such components are disposed in the passenger compartment 18 of the vehicle 10. The propulsion controls may be actuated or controlled by a driver of the vehicle 10 and may be directly connected to corresponding components of the propulsion system, such as a throttle, a brake, a vehicle axle, a vehicle transmission, and the like, respectively. In some embodiments, the propulsion controls may communicate signals to a vehicle computer (e.g., drive by wire) which in turn may control the corresponding propulsion component of the propulsion system. As such, in some embodiments, the vehicle 10 may be an autonomous vehicle.

In some embodiments, the vehicle 10 includes a transmission in communication with a crankshaft via a flywheel or clutch or fluid coupling. In some embodiments, the transmission includes a manual transmission. In some embodiments, the transmission includes an automatic transmission. The vehicle 10 may include one or more pistons, in the case of an internal combustion engine or a hybrid vehicle, which cooperatively operate with the crankshaft to generate force, which is translated through the transmission to one or more axles, which turns wheels 22. When the vehicle 10 includes one or more electric motors, a vehicle battery, and/or fuel cell provides energy to the electric motors to turn the wheels 22.

The vehicle 10 may include automatic vehicle propulsion systems, such as a cruise control, an adaptive cruise control, automatic braking control, other automatic vehicle propulsion systems, or a combination thereof. The vehicle 10 may be an autonomous or semi-autonomous vehicle, or other suitable type of vehicle. The vehicle 10 may include additional or fewer features than those generally illustrated and/or disclosed herein.

In some embodiments, the vehicle 10 may include an Ethernet component 24, a controller area network (CAN) bus 26, a media oriented systems transport component (MOST) 28, a FlexRay component 30 (e.g., brake-by-wire system, and the like), and a local interconnect network component (LIN) 32. The vehicle 10 may use the CAN bus 26, the MOST 28, the FlexRay Component 30, the LIN 32, other suitable networks or communication systems, or a combination thereof to communicate various information from, for example, sensors within or external to the vehicle, to, for example, various processors or controllers within or external to the vehicle. The vehicle 10 may include additional or fewer features than those generally illustrated and/or disclosed herein.

In some embodiments, the vehicle 10 may include a steering system, such as an EPS system, a steering-by-wire steering system (e.g., which may include or communicate with one or more controllers that control components of the steering system without the use of mechanical connection between the handwheel and wheels 22 of the vehicle 10), or other suitable steering system. The steering system may include an open-loop feedback control system or mechanism, a closed-loop feedback control system or mechanism, or combination thereof. The steering system may be configured to receive various inputs, including, but not limited to, a handwheel position, an input torque, one or more roadwheel positions, other suitable inputs or information, or a combination thereof. Additionally, or alternatively, the inputs may include a handwheel torque, a handwheel angle, a motor velocity, a vehicle speed, an estimated motor torque command, other suitable input, or a combination thereof. The steering system may be configured to provide steering function and/or control to the vehicle 10. For example, the steering system may generate an assist torque based on the various inputs. The steering system may be configured to selectively control a motor of the steering system using the assist torque to provide steering assist to the operator of the vehicle 10.

Figure 2:
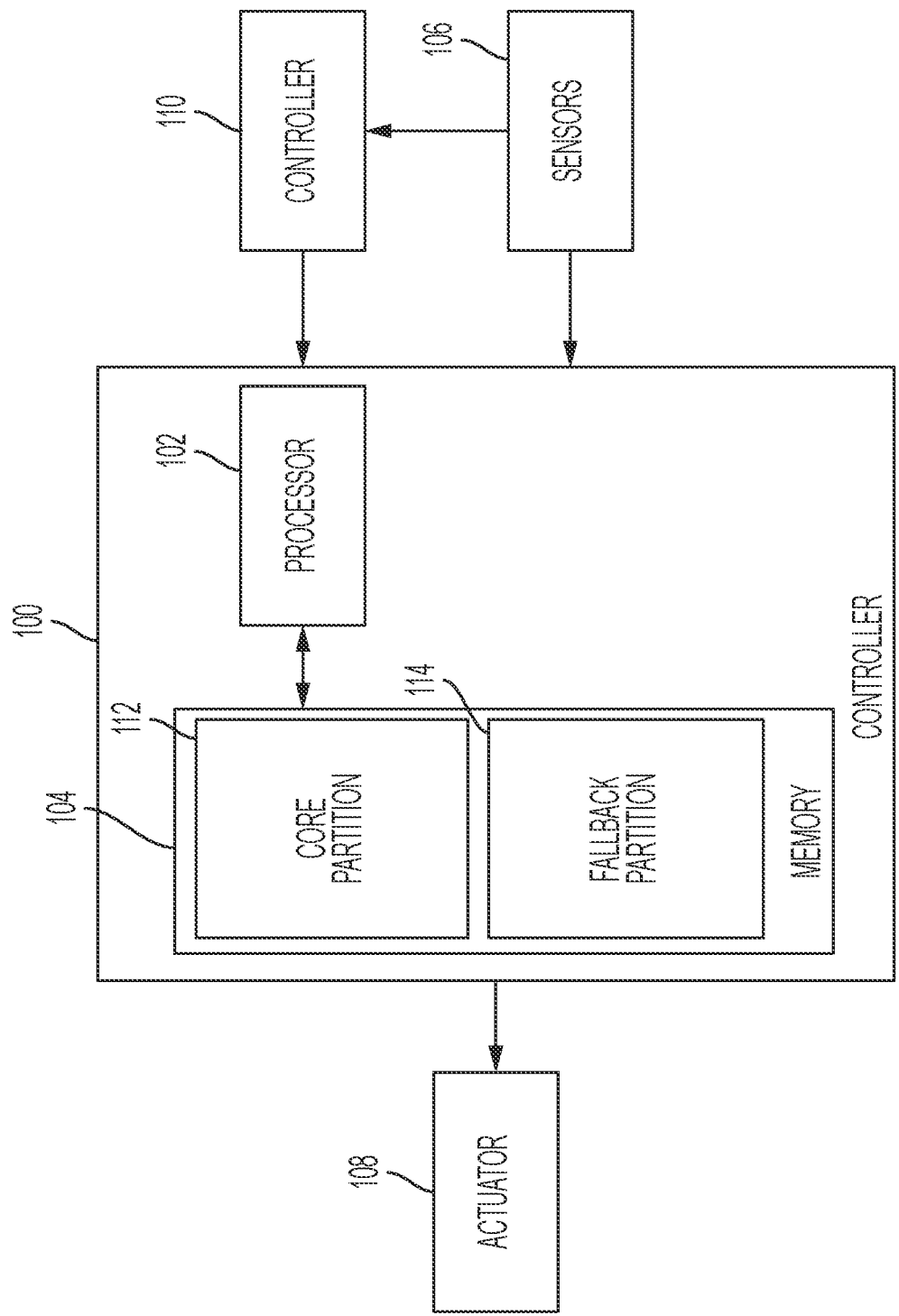
FIG. 2 generally illustrates an actuator control system according to the principles of the present disclosure.

In some embodiments, the vehicle 10 may include a controller, such as controller 100, as is generally illustrated in FIG. 2. The controller 100 may include any suitable controller, such as an electronic control unit or other suitable controller. The controller 100 may be configured to control, for example, the various functions of the steering system and/or various functions of the vehicle 10. The controller 100 may include a processor 102 and a memory 104. The processor 102 may include any suitable processor, such as those described herein. Additionally, or alternatively, the controller 100 may include any suitable number of processors, in addition to or other than the processor 102. The memory 104 may comprise a single disk or a plurality of disks (e.g., hard drives), and includes a storage management module that manages one or more partitions within the memory 104. In some embodiments, memory 104 may include flash memory, semiconductor (solid state) memory or the like. The memory 104 may include Random Access Memory (RAM), a Read-Only Memory (ROM), or a combination thereof. The memory 104 may include instructions that, when executed by the processor 102, cause the processor 102 to, at least, control various aspects of the vehicle 10.

The controller 100 may receive one or more signals from various measurement devices or sensors 106 indicating sensed or measured characteristics of the vehicle 10. The sensors 106 may include any suitable sensors, measurement devices, and/or other suitable mechanisms. For example, the sensors 106 may include one or more torque sensors or devices, one or more handwheel position sensors or devices, one or more motor position sensor or devices, one or more position sensors or devices, other suitable sensors or devices, or a combination thereof. The one or more signals may indicate a handwheel torque, a handwheel angel, a motor velocity, a vehicle speed, other suitable information, or a combination thereof.

In some embodiments, controller 100 may be configured to provide actuator control, as described. The memory 104 of the controller 100 may include one or more partitions, such as the core partition 112 and the fallback partition 114. The core partition 112 may be configured to store an actuator control software component, as described. Additionally, or alternatively, the fallback partition may be configured to, optionally, include a fallback control software component, as described.

The controller 100 may generate, in response to receiving a torque command signal from a controller 110, an actuator control signal, using the actuator control software component of the core partition 112. The controller 110 may include any suitable controller, such as a domain controller or other suitable controller. The controller 110 may include features similar to those of the controller 100 or different from those of the controller 100. The torque command signal may indicate a torque command. The torque command may be generated by the controller 110 responsive to one or more signals associated with one or more sensors 106. The torque command may correspond to an assist torque for assisting an operator of the vehicle 10 with steering functions of the vehicle 10 or other suitable application of the steering system or other suitable component of the vehicle 10.

The controller 100 may selectively control an actuator 108 based on the actuator control signal, using the actuator control software component of the core partition 112. The actuator 108 may be associated with the steering system or other suitable component of the vehicle 10. The actuator control signal may indicate a voltage or current to be applied to the actuator 108. The controller 100 may be configured to, using the actuator control software component of the core partition 112, receive torque commands from the controller 110 and to apply voltage and/or current to the actuator 108 to achieve a torque associated with the torque command.

The controller 100 may be configured to identify one or more faults associated with the controller 110. For example, the controller 100 may be configured to identify one or more faults associated with the controller 110 by identifying an interruption in communication with the controller 110. For example, the controller 100 may be configured to receive a signal indicating a fault with the controller 110. Additionally, or alternatively the controller 100 may be configured to detect a loss in communication with the controller 110 based on an absence of the torque command signal from the controller 110. The controller 100 may generate a torque command using signals from the sensors 106 and may compare the torque command to a torque command received from the controller 110. The controller 100 may determine a fault in the controller 110 based on the comparison (e.g., responsive to the comparison indicating a discrepancy in the toque command and the torque command received from the controller 110). It should be understood that the controller 100 may be configured to determine or identify a fault in the controller 110 or in the communication with the controller 110 using any suitable technique in addition to or instead of those described herein.

The controller 100 may, in response to identifying a fault associated with the controller 110, determine whether the fallback partition 114 includes the fallback control software component. The controller 100 may generate, responsive to a determination that fallback partition 114 includes the fallback control software component, a fallback actuator control signal using the fallback control software component. The controller 100 may selectively control the actuator 108 based on the fallback actuator control signal.

The controller 100 may, using the fallback control software component, generate the fallback actuator control signal using one or more signals from one or more sensors of the vehicle, a previously received toque command from the first controller, one or more predetermined values (e.g., associated with a limp home mode or other suitable function or mode), other suitable information, or a combination thereof. The fallback control software component may be configured to generate the fallback actuator control signal based on a corrective action, which may include generating a fallback value associated with a limp home mode, generating a fallback value based on at least one sensor signal, generating a fallback value based on a previous torque command signal from the first controller, and/or other suitable corrective action. The controller 100 may, using the fallback control software component, the fallback actuator control signal based on the fallback value. The fallback value may correspond to an amount of toque to be applied to the actuator to cause the actuator to function in the absence of the torque control signal from the first controller.

In some embodiments, the controller 100 may generate, responsive to a determination that the fallback partition 114 does not include the fallback control software component, the fallback actuator control signal based on a default value stored in the core partition 112 or stored in any suitable location.

In some embodiments, the controller 100 may perform the methods described herein. However, the methods described herein as performed by the controller 100 are not meant to be limiting, and any type of software executed on a controller or processor can perform the methods described herein without departing from the scope of this disclosure.

For example, a controller, such as a processor executing software within a computing device, can perform the methods described herein.

Figure 3:
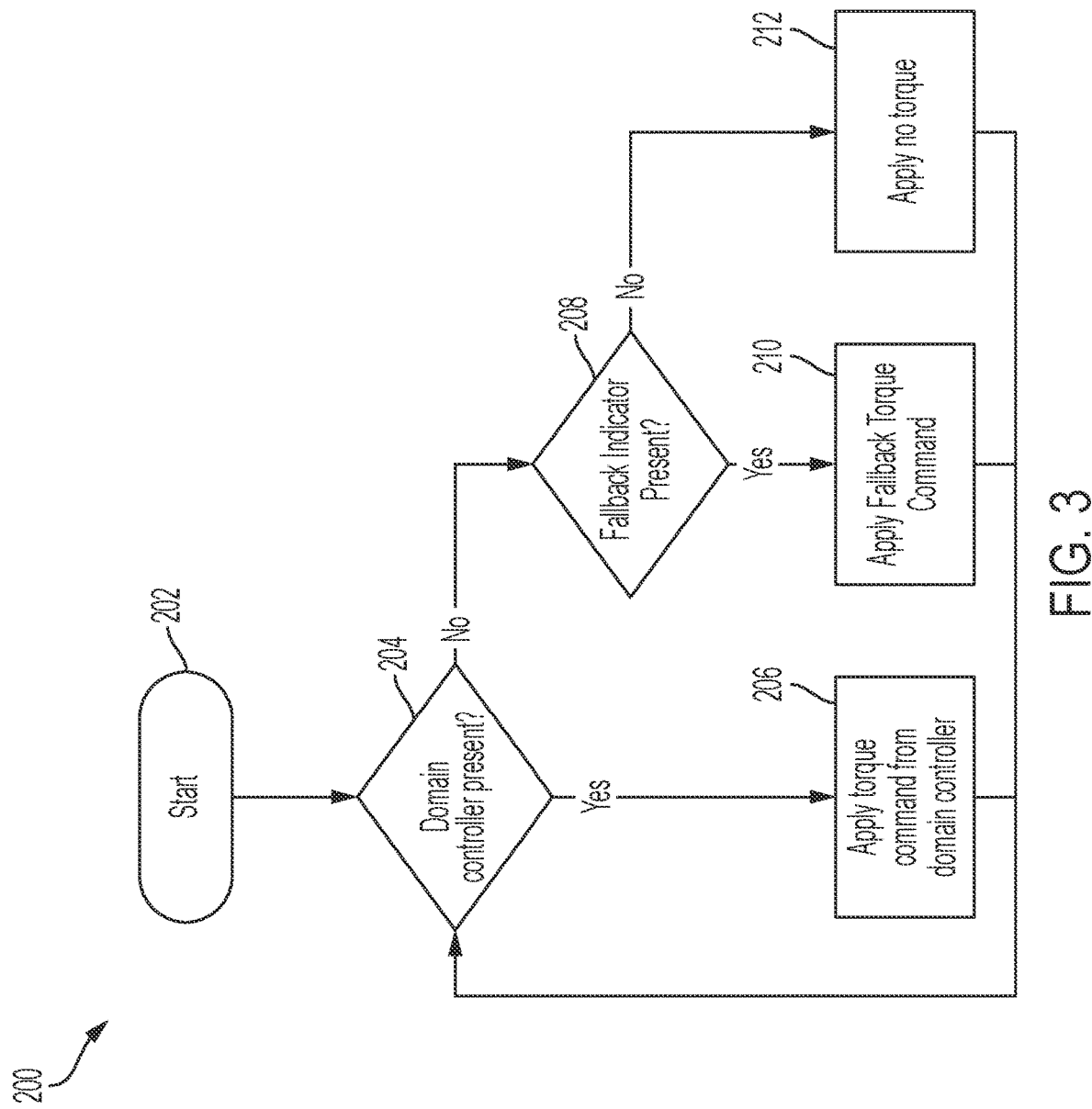
FIG. 3 is a flow diagram generally illustrating an actuator control method according to the principles of the present disclosure.

FIG. 3 is a flow diagram generally illustrating an actuator control method 200 according to the principles of the present disclosure. At 202, the method 200 begins. At 204, the method 200 determine whether a domain controller is present. For example, the controller 100 may determine whether the controller 110 is present (e.g., based on one or more signals received from the controller 110 or using any suitable technique). If the controller 100 determines that the controller 110 is present, the method 200 continues at 206. Alternatively, if the controller 100 determines that the controller 110 is not present, the method 200 continues at 208.

At 206, the method 200 applies a torque command from the domain controller. For example, the controller 100 may generate the actuator control signal based on the torque command from the controller 110. The controller 100 may control the actuator 108 based on the actuator control signal.

At 208, the method 200 determines if a fallback indicator is present. For example, the controller 100 may determine whether the fallback control software component is present. If the controller 100 determines the fallback control software is present, the method 200 continues at 210. Alternatively, if the controller 100 determines that the fallback control software is not present, the method 200 continues at 212.

At 210, the method 200 applies a fallback torque command. For example, the controller 100 may apply the fallback torque command (e.g., by generating the actuator control signal and by controlling the actuator 108 based on the actuator control signal).

At 212, the method 200 does not apply torque. For example, the controller 100 may discontinue, or not initiate, application of a suitable voltage or current to the actuator 108

Figure 4:
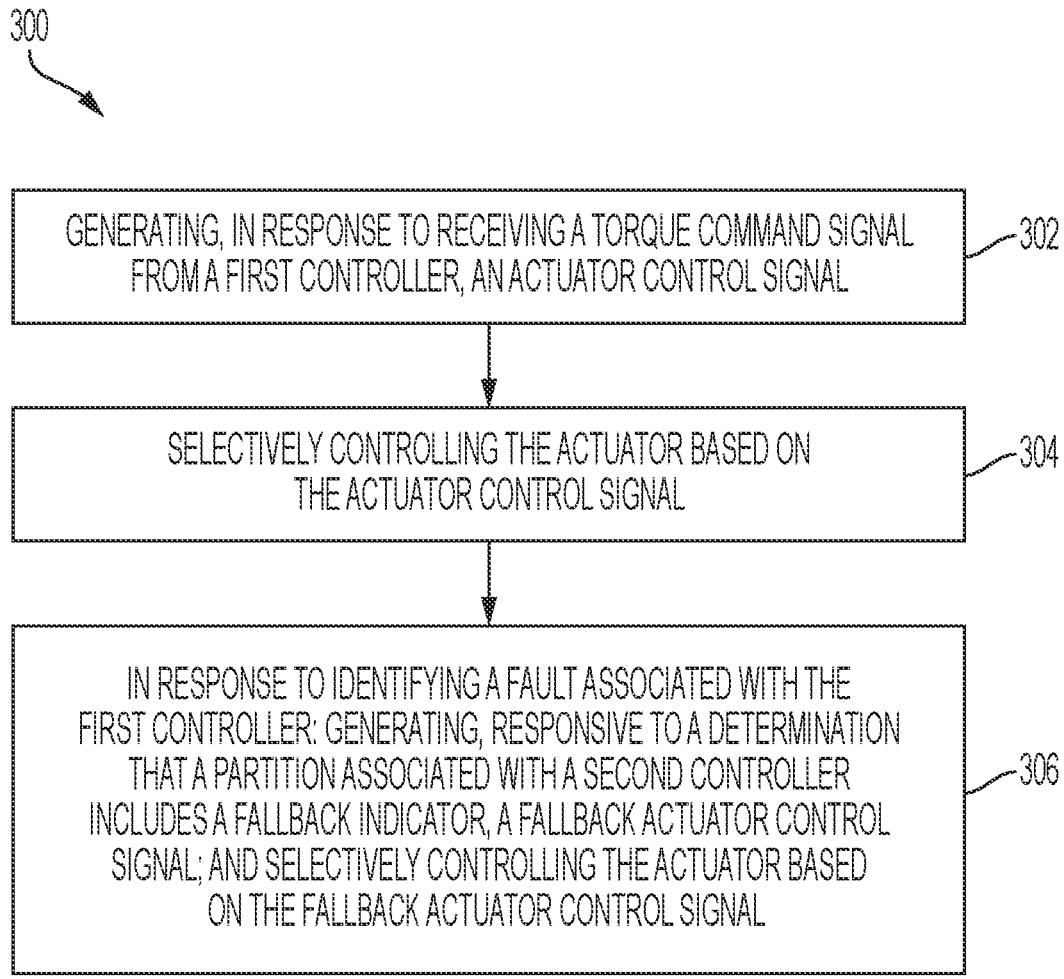
FIG. 4 is a flow diagram generally illustrating an alternative actuator control method according to the principles of the present disclosure.

FIG. 4 is a flow diagram generally illustrating an alternative actuator control method 300 according to the principles of the present disclosure. At 302, the method 300 generates, in response to receiving a torque command signal from a first controller, an actuator control signal. For example, the controller 100 may generate the actuator control signal based on a torque command received from the controller 110.

At 304, the method 300 selectively controls the actuator based on the actuator control signal. For example, the controller 100 may control the actuator 108 based on the actuator control signal.

At 306, the method 300, in response to identifying a fault associated with the first controller: generates, responsive to a determination that a partition associated with a second controller includes a fallback indicator, a fallback actuator control signal; and selectively controls the actuator based on the fallback actuator control signal. For example, the controller 100 may, in response to identifying a fault associated with the controller 110 generate, responsive to a determination that the fallback partition 114 includes a fallback indicator (e.g., the fallback control software component), a fallback actuator control signal. The controller 100 may selectively control the actuator 108 based on the fallback actuator control signal.

In some embodiments, a method for controlling an actuator includes generating, in response to receiving a torque command signal from a first controller, an actuator control signal. The method also includes selectively controlling the actuator based on the actuator control signal. The method also includes, in response to identifying a fault associated with the first controller: generating, responsive to a determination that a partition associated with a second controller includes a fallback indicator, a fallback actuator control signal; and selectively controlling the actuator based on the fallback actuator control signal.

In some embodiments, the actuator is associated with a steering system. In some embodiments, the steering system includes an electronic power steering system. In some embodiments, identifying a fault associated with the first controller includes identifying an interruption in communication with the first controller. In some embodiments, the method also includes generating, responsive to a determination that the partition associated with the second controller does not include the fallback indicator, the fallback actuator control signal based on a default value. In some embodiments, the fallback indicator is associated with a corrective action. In some embodiments, the corrective action includes generating a fallback value associated with a limp home mode. In some embodiments, the corrective action includes generating a fallback value based on at least one sensor signal. In some embodiments, the corrective action include generating a fallback value based on a previous torque command signal from the first controller.

In some embodiments, a system for controlling an actuator includes a processor and a memory. The memory includes instructions that, when executed by the processor, cause the processor to: generate, in response to receiving a torque command signal from a first controller, an actuator control signal; selectively control the actuator based on the actuator control signal; and, in response to identifying a fault associated with the first controller: generate, responsive to a determination that a partition associated with a second controller includes a fallback indicator, a fallback actuator control signal; and selectively control the actuator based on the fallback actuator control signal.

In some embodiments, the actuator is associated with a steering system. In some embodiments, the steering system includes an electronic power steering system. In some embodiments, the instructions further cause the processor to identify a fault associated with the first controller by identifying an interruption in communication with the first controller. In some embodiments, the instructions further cause the processor to generate, responsive to a determination that the partition associated with the second controller does not include the fallback indicator, the fallback actuator control signal based on a default value. In some embodiments, the fallback indicator is associated with a corrective action. In some embodiments, the corrective action includes generating a fallback value associated with a limp home mode. In some embodiments, the corrective action includes generating a fallback value based on at least one sensor signal. In some embodiments, the corrective action include generating a fallback value based on a previous torque command signal from the first controller.

In some embodiments, an electronic control unit, in communication with an actuator, includes a processor and a memory. The memory includes instructions that, when executed by the processor, cause the processor to: generate, in response to receiving a torque command signal from a controller, an actuator control signal; selectively control the actuator based on the actuator control signal; and, in response to identifying an interruption with the controller: generate, responsive to a determination that a partition associated with the electronic control unit includes a fallback indicator, a fallback actuator control signal; generate, responsive to a determination that the partition associated with the electronic control unit does not include the fallback indicator, the fallback actuator control signal based on a default value; and selectively control the actuator based on the fallback actuator control signal.

In some embodiments, the actuator is associated with a steering system.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

The word "example" is used herein to mean serving as an example, instance, or illustration. Any aspect or design described herein as "example" is not necessarily to be construed as preferred or advantageous over other aspects or designs. Rather, use of the word "example" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one implementation" throughout is not intended to mean the same embodiment or implementation unless described as such.

Implementations the systems, algorithms, methods, instructions, etc., described herein can be realized in hardware, software, or any combination thereof. The hardware can include, for example, computers, intellectual property (IP) cores, application-specific integrated circuits (ASICs), programmable logic arrays, optical processors, programmable logic controllers, microcode, microcontrollers, servers, microprocessors, digital signal processors, or any other suitable circuit. In the claims, the term "processor" should be understood as encompassing any of the foregoing hardware, either singly or in combination. The terms "signal" and "data" are used interchangeably.

As used herein, the term module can include a packaged functional hardware unit designed for use with other components, a set of instructions executable by a controller (e.g., a processor executing software or firmware), processing circuitry configured to perform a particular function, and a self-contained hardware or software component that interfaces with a larger system. For example, a module can include an application specific integrated circuit (ASIC), a Field Programmable Gate Array (FPGA), a circuit, digital logic circuit, an analog circuit, a combination of discrete circuits, gates, and other types of hardware or combination thereof. In other embodiments, a module can include memory that stores instructions executable by a controller to implement a feature of the module.

Further, in one aspect, for example, systems described herein can be implemented using a general-purpose computer or general-purpose processor with a computer program that, when executed, carries out any of the respective methods, algorithms, and/or instructions described herein. In addition, or alternatively, for example, a special purpose computer/processor can be utilized which can contain other hardware for carrying out any of the methods, algorithms, or instructions described herein.

Further, all or a portion of implementations of the present disclosure can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments, implementations, and aspects have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

Having thus described the invention, it is claimed:

1. A method for controlling an actuator, the method comprising:
generating, using actuator control software stored on a first partition of an electronic control unit and in response to receiving a torque command signal from a first controller, an actuator control signal;
selectively controlling, using the actuator control software stored on the first partition of the electronic control unit, the actuator based on the actuator control signal; and
in response to identifying a fault associated with the first controller:
generating, responsive to a determination that a second partition associated with the electronic control unit includes fallback software, a fallback actuator control signal using the fallback software stored on the second partition of the electronic control unit, wherein the electronic control unit includes a hypervisor software component configured to allow the actuator control software to execute in parallel with the fallback software, and wherein the fallback software is flashed to the second partition of the electronic control unit independently of the actuator control software flashed to the first partition of the electronic control unit, wherein: the electronic control unit is partitioned into at least the first partition and the second partition, the hypervisor software is configured to allow communication between the actuator control software stored on the first partition of the electronic control unit and the fallback software stored on the second partition of the electronic control unit, and the actuator software is configured to control the actuator based on a general control parameter, agnostic of a vehicle-wide function of the actuator; and
selectively controlling the actuator based on the fallback actuator control signal.

2. The method of claim 1, wherein the actuator is associated with a steering system.

3. The method of claim 2, wherein the steering system includes an electronic power steering system.

4. The method of claim 1, wherein identifying a fault associated with the first controller includes identifying an interruption in communication with the first controller.

5. The method of claim 1, further comprising generating, responsive to a determination that the second partition of the electronic control unit does not include the fallback software, the fallback actuator control signal based on a default value.

6. The method of claim 1, wherein the fallback software implements a corrective action.

7. The method of claim 6, wherein the corrective action includes generating a fallback value associated with a limp home mode.

8. The method of claim 6, wherein the corrective action includes generating a fallback value based on at least one sensor signal.

9. The method of claim 6, wherein the corrective action include generating a fallback value based on a previous torque command signal from the first controller.

10. A system for controlling an actuator, the system comprising:
a processor; and
a memory including instructions that, when executed by the processor, cause the processor to:
generate, using actuator control software stored on a first partition associated with the processor and in response to receiving a torque command signal from a first controller, an actuator control signal;
selectively control the actuator based on the actuator control signal; and
in response to identifying a fault associated with the first controller:
generate, responsive to a determination that a second partition associated with the processor includes fallback software, a fallback actuator control signal using the fallback software stored on the second partition associated with the processor, wherein the processor executes a hypervisor software component configured to allow the actuator control software to execute in parallel with the fallback software, and wherein the fallback software is flashed to the second partition of the processor independently of the actuator control software flashed to the first partition of the processor, wherein: the electronic control unit is partitioned into at least the first partition and the second partition, the hypervisor software is configured to allow communication between the actuator control software stored on the first partition of the electronic control unit and the fallback software stored on the second partition of the electronic control unit, and the actuator software is configured to control the actuator based on a general control parameter, agnostic of a vehicle-wide function of the actuator; and
selectively control the actuator based on the fallback actuator control signal.

11. The system of claim 10, wherein the actuator is associated with a steering system.

12. The system of claim 11, wherein the steering system includes an electronic power steering system.

13. The system of claim 10, wherein the instructions further cause the processor to identify a fault associated with the first controller by identifying an interruption in communication with the first controller.

14. The system of claim 10, wherein the instructions further cause the processor to generate, responsive to a determination that the second partition associated with the processor does not include the fallback software, the fallback actuator control signal based on a default value.

15. The system of claim 10, wherein the fallback software implements a corrective action.

16. The system of claim 15, wherein the corrective action includes generating a fallback value associated with a limp home mode.

17. The system of claim 15, wherein the corrective action includes generating a fallback value based on at least one sensor signal.

18. The system of claim 15, wherein the corrective action include generating a fallback value based on a previous torque command signal from the first controller.

19. An electronic control unit in communication with an actuator, the electronic control unit comprising:
a processor; and
a memory including instructions that, when executed by the processor, cause the processor to:
generate, using actuator control software stored on a first partition of the electronic control unit and in response to receiving a torque command signal from a controller, an actuator control signal;
selectively control the actuator based on the actuator control signal; and
in response to identifying an interruption with the controller:
generate, responsive to a determination that a second partition of the electronic control unit includes fallback software, a fallback actuator control signal using the fallback software stored on the second partition of the electronic control unit, wherein the electronic control unit includes a hypervisor software component configured to allow the actuator control software to execute in parallel with the fallback software, and wherein the fallback software is flashed to the second partition of the electronic control unit independently of the actuator control software flashed to the first partition of the electronic control unit, wherein: the electronic control unit is partitioned into at least the first partition and the second partition, the hypervisor software is configured to allow communication between the actuator control software stored on the first partition of the electronic control unit and the fallback software stored on the second partition of the electronic control unit, and the actuator software is configured to control the actuator based on a general control parameter, agnostic of a vehicle-wide function of the actuator;
generate, responsive to a determination that the second partition of the electronic control unit does not include the fallback software, the fallback actuator control signal based on a default value; and
selectively control the actuator based on the fallback actuator control signal.

20. The electronic control unit of claim 19, wherein the actuator is associated with a steering system.

* * * * *